Jan. 21, 1958 M. ZADEK ET AL 2,820,684
COUNTER PARTITION AND DISPLAY APPARATUS
Filed Feb. 8, 1954

Inventors,
Milton Zadek
By William Raisch,
Morris Spector Atty.

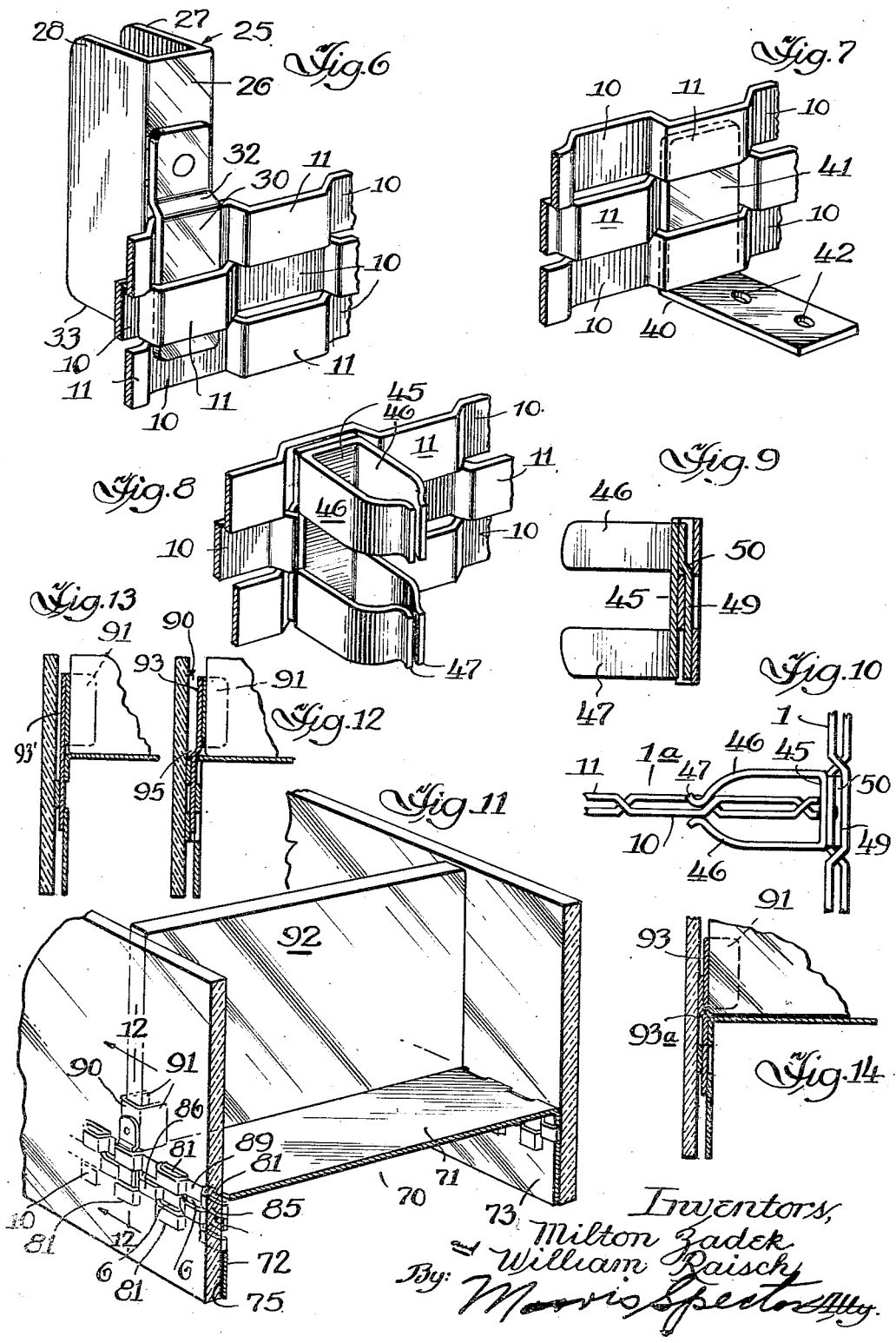

Jan. 21, 1958    M. ZADEK ET AL    2,820,684
COUNTER PARTITION AND DISPLAY APPARATUS
Filed Feb. 8, 1954    3 Sheets-Sheet 3
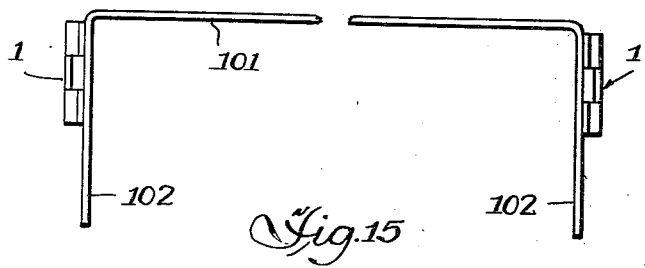
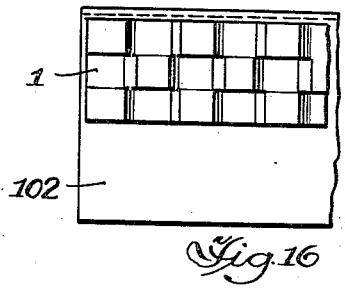
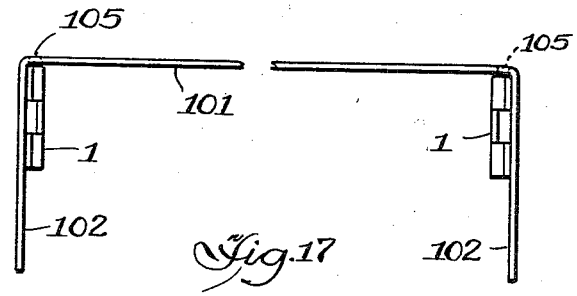
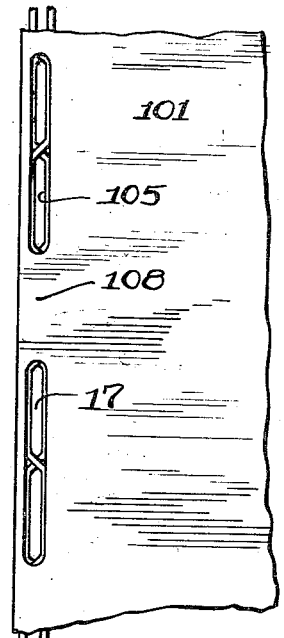
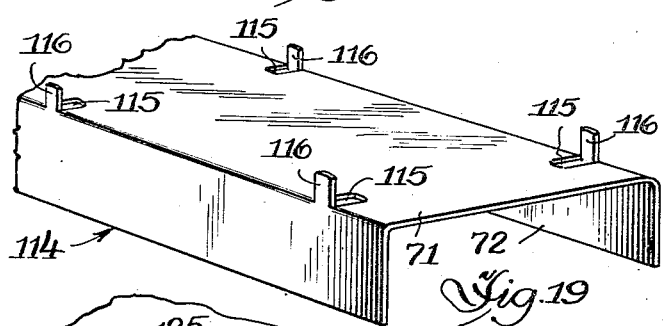
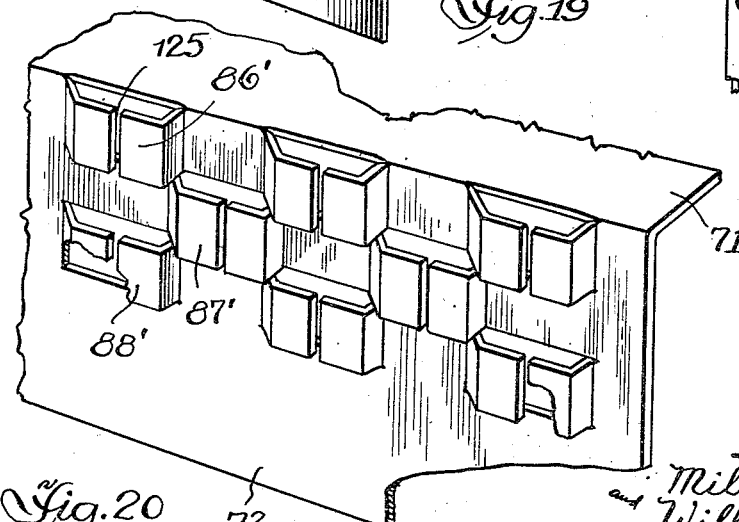
Inventors,
Milton Zadek
William Raisch
By Morris Spector Atty

United States Patent Office 2,820,684
Patented Jan. 21, 1958

2,820,684

COUNTER PARTITION AND DISPLAY APPARATUS

Milton Zadek, Winnetka, and William Raisch, West Chicago, Ill., assignors to Reflector-Hardware Corporation, Chicago, Ill., a corporation of Illinois Application February 8, 1954, Serial No. 408,860

1 Claim. (Cl. 312—140.3)

This invention relates to equipment for use on counters that are used for displaying merchandise, particularly open bin type of counters, and is particularly concerned with equipment for facilitating partitioning or subdividing the top of the counter into compartments to facilitate the display of the merchandise.

It is customary to provide means for subdividing the top of a counter into separate compartments or bins by means of vertical dividers that are adjustably mounted in place so that the respective compartments thus formed may be varied in size as becomes necessary. It is also customary to provide means for holding dividers fixed. It is an object of the present invention to provide a strip that may be mounted on the counter top and which is so constructed and arranged that it may receive and hold partition-holding clips rigidly in any of a large number of locations, the possible adjustments being such that successive possible positions of clips are no further apart than an amount of the order of the width of the clip. This allows a large number of adjustments of the position of the partition-holding clips and therefore a large possible number of adjustments of the width or length of the subdivided bin or compartment. The strip may also be used for holding fixed partitions. In either event, the partitions are held rigidly in the precise positions where they have been located.

It is a further object of the present invention to provide a clip-holding structure for the purposes above mentioned which will be simple and economical of construction and simple and easy to mount in place on a counter bin. It is a still further object of the present invention to provide a ratchet strip of the above-mentioned character which can itself be mounted, by means of a suitable clip, to another and similar ratchet strip that is mounted on the counter.

In the display of small articles of merchandise on a counter bin, it is often desirable to provide an inverted box-like structure, known as a "sham," that provides an elevated top for the bin. The merchandise covers and conceals the sham which, by its presence, reduces the amount of merchandise required to produce the appearance of a full bin. It is one of the objects of the present invention to provide a sham which has incorporated therein or which may hold a ratchet strip of the above-mentioned character which can then receive and hold various types of clips used to support dividers or binning equipment for dividing the counter top into a number of sub-compartments variable as to size by very small increments.

In the drawings:

Fig. 6 is a fragmentary perspective view of the ratchet strip of Fig. 3 in combination with a divider holding clip;

Fig. 7 is a fragmentary sectional view showing one means for holding the ratchet strip of Fig. 3 on a counter top;

Fig. 8 is a view similar to Fig. 6, showing the ratchet strip holding a clip of a different type;

Fig. 9 is a fragmentary sectional view taken crosswise of the ratchet strip of Fig. 7 along the longitudinal center line of the clip;

Fig. 10 is a plan view showing the use of the clip of Fig. 8 for joining one ratchet strip to another;

Fig. 11 is a perspective view of a portion of a counter top with a sham embodying the present invention;

Fig. 12 is a fragmentary sectional view taken along the line 12—12 of Fig. 11;

Fig. 13 is a view similar to Fig. 12, taken at the next adjacent clip-receiving socket of Fig. 11;

Fig. 14 is a view similar to Fig. 13, showing an alternate clip construction;

Fig. 15 is an end view of a modified sham structure embodying the present invention;

Fig. 16 is a side view of the sham of Fig. 15;

Fig. 17 is an end view of still another sham construction;

Fig. 18 is a fragmentary plan view of a portion of the sham of Fig. 17; and

Figs. 19 and 20 are fragmentary perspective views of other shams embodying the present invention.

Figure 1:
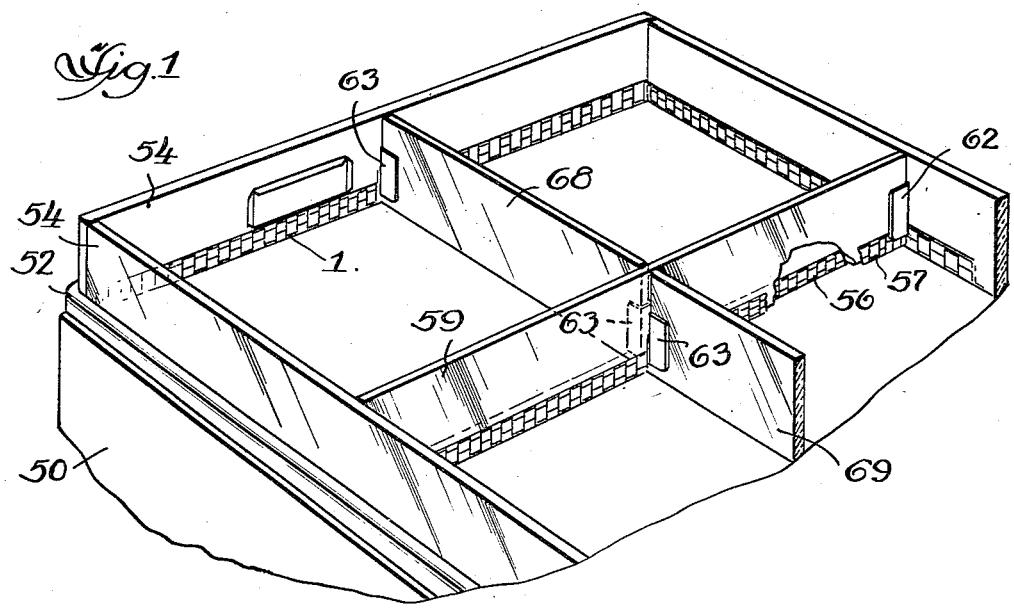
Fig. 1 is a fragmentary broken away perspective view of a counter top provided with partitioning bins held in place by equipment of the present invention.

Reference may now be had more particularly to the drawings wherein like reference numerals designate like parts throughout. For this purpose, reference may first be had to Figs. 2, 3, 4 and 5 that show the construction of the ratchet strip of the present invention.

The ratchet strip, indicated in general by the reference numeral 1, comprises a unitary strip of any desired material. In this instance the material is steel, although it is to be understood that the strip may be made of any other metal, or of any other suitable material which may be non-metal. The strip 1 is divided into three lengthwise extending parts 2, 3 and 4 by a series of aligned slits 6. The slits 6—6 are in two parallel rows, those in each row being lengthwise aligned with one another and the slits in the two rows being aligned with one another in a direction crosswise of the strip. Adjacent slits 6—6 of each row are spaced apart a small amount, as indicated at 8, namely an amount of the order of the thickness of the material of the ratchet strip. It is obvious that the parts 2, 3 and 4 are separated from each other at the slits 6 and are held together as one unit only at the successive connecting portions 8. The spacing 8 may be slightly more or slightly less than the thickness of the metal, it being desirable to make the spacing 8 as small as possible consistent with the retention of the necessary strength for the strip. The sheet that is to constitute the ratchet strip is then deformed to form the parts 2, 3 and 4 into sinuous curved lengths, the part 2, for instance, being deformed so that at alternate slits 6—6 the metal lies forwardly of the median plane of the ratchet strips, as indicated at 10—10, and at the intervening alternate slits 6—6 the metal lies rearwardly of the median plane of the strip, as indicated at 11—11. Successive lengths 10 and 11 are joined by a diagonal portion 13. The parts 10 and 11 are preferably substantially flat. The opposite end lengths 2 and 4 are deformed identically so that corresponding forward extending flats 10 of the parts 2 and 4 are in alignment transversely of the ratchet strip. The intermediate part 3 is deformed as are the parts 2 and 4 except that the forward extending flats 10 of the center part 3 are in alignment in a transverse direction of the ratchet strip with the rearwardly extending flats 11 of the upper and lower parts 2 and 3. All of the flats 10 of the parts 2, 3 and 4 preferably lie in one plane and all of the flats 11 of the three parts 2, 3 and 4 lie in another plane. While the surfaces of the parts 10 and 11 are made flat, they may, if desired, be curved. It is thus apparent that the connecting diagonal portions 13 of the parts 2 and 4 cross at a substantial angle the corresponding connecting diagonals 15 of the center part 3. Where they cross, they are joined by the original metal of the sheet from which the ratchet strip was formed. As may be seen from Fig. 2, the flats 10 and 11 form sockets 17. Each of these sockets is adapted to receive and hold the tongue of a mounting clip, as will be set forth more fully as this description proceeds. It is sufficient here to note that the sockets 17 are of identical construction and that the spacing between adjacent sockets is a minimum, substantially of the order of the thickness of the sheet from which the ratchet strip was formed. It is apparent from Fig. 2 that if the tongue of a clip is inserted in any one of two adjacent sockets, the difference in position is approximately equal to the width of a socket, being only slightly more than the width of the tongue of the clip inserted therein.

The center part 3 of the ratchet strip may, optionally, have a number of mounting holes 19—19 formed therein, some being formed at the forwardly extending flats 10 and others being formed at the rearwardly extending flats 11, so that the strip may be nailed in position along the rim of a counter, if desired.

Reference may now be had more particularly to Fig. 6 that illustrates one type of glass divider clip held on a ratchet strip of the present invention. In this instance, the divider clip 25 comprises a channel 26 the sides 27 and 28 of which constitute a pair of wings for receiving a dividing partition such as, for instance, a pane of glass, which is frictionally inserted between the wings 27—28. The clip 25 includes a tongue 30 which is secured to the channel 26 in any desired manner as, for instance, by welding, and which is displaced from the trough of the channel by an amount of the order of the thickness of the material of the ratchet strip, as by an offset 32. If desired, the tongue 30 may not be a separate piece from the channel. It may be formed by stamping the same from the back of the channel. The tongue 30 is of a width slightly less than the width of each of the flats 10 or 11. The bottom edge 33 of the channel 26 is at the same elevation as the bottom of the tongue 30. The tongue may be inserted in any one of the sockets 17. This is illustrated in Fig. 6, wherein the forward flats 10—10 of the upper and lower parts 2 and 4 lie between the tongue 30 and the back of the channel 26. If the tongue were inserted into the next socket, the forward extending flat 10 of the middle strip would extend between the tongue 30 and the channel 26 while the rearwardly extending flats 11—11 of the upper and lower parts 2 and 4 would overlie the back of the tongue. In this way the clip is held by the tongue in any desired socket. If the spacing between the tongue 30 and the channel 26 is greater than the thickness of the ratchet strip, that will not adversely affect the operation of the clip.

Figure 3:
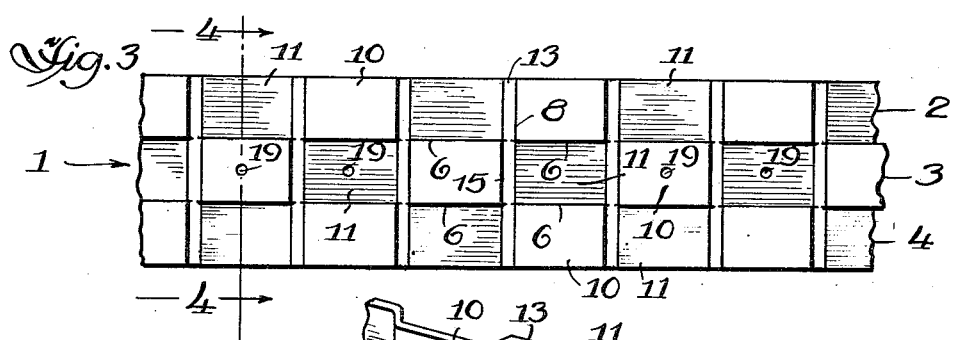
Fig. 3 is a front view of the ratchet strip.
Figure 4:
Fig. 4 is a sectional view taken along the line 4—4 of Fig. 3.
Figure 5:
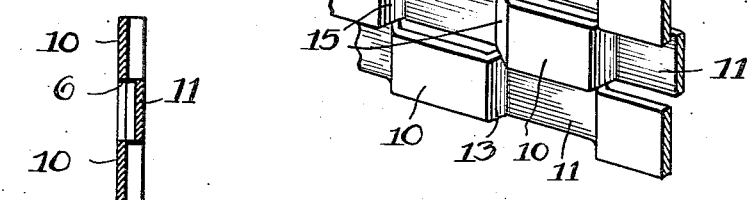
Fig. 5 is a fragmentary perspective view of the ratchet strip of Fig. 3.

In Fig. 7 I have illustrated a clip 40 used in connection with the ratchet clip of Fig. 3 for supporting the ratchet strip. This clip is an L-shaped clip one arm 41 of which may be inserted into any socket 17 and the other arm used as a support to hold the ratchet strip in place and may have mounting holes 42 for receiving mounting nails or screws, or other means to mount it into a slot.

In Figs. 8, 9 and 10 I have shown another type of clip which may be used in connection with the ratchet strip of Fig. 3. This clip comprises a back 45 from which extends a pair of upper spring arms 46—46 and a pair of similar lower spring arms 47—47 all constituting a single piece of material. A tongue 49 having an offset portion 50 is secured to the back 45 in any desired manner, as by welding, and spaced therefrom an amount sufficient to allow the clip to straddle one of the flats 10 or 11. The spring arms 46—46 (and the spring arms 47—47) are spaced from one another at their free ends an amount less than the thickness of the formed ratchet strip, that is, less than the offset between the flats 10 and 11 or any of the parts 2, 3 or 4. In Fig. 10 there is illustrated one use of this clip for connecting two ratchet strips such as shown in Fig. 3, and which ratchet strips are at right angles to one another. In this instance, the ratchet strips indicated at 1 and 1a are each of the construction illustrated in Fig. 3. One of these two ratchet strips, for instance the ratchet strip 1, may be considered as mounted in place in any desired manner. The tongue 49 of the clip extends into one of the sockets 17 thereof. The end of the other ratchet strip 1a is held between the spring arms 46—46 and the spring arms 47—47. In this instance, one of the spring arms 46 engages a flat 10 of the upper part 2 of the strip 1a whereas its opposite arm 46 engages the adjacent diagonal portion 13 of that upper strip. The lower spring arms 47—47 which are in line with the upper arms 46—46 similiarly engage the subjacent flat and diagonal portion of the lowermost part 4 of the strip 1a. In this manner the identical strips 1 and 1a are secured together with the two strips extending at right angles to one another.

It is clear from the description of Figs. 6 through 10 that in each case the tongue that is received within a socket of the ratchet strip is rigidly held in place in the socket in the location where it has been positioned. As a result, the partition or other member that is held by the clip remains firmly secured in place where it has been located, without any likelihood that the item will slide along the ratchet strip.

Reference may now be had more particularly to Fig. 1 showing the application of the ratchet strip of the present invention to a counter construction. A counter is indicated in general by the reference number 50 which counter may include a rim 52 that forms the top of the counter into a large bin. The useful height of the bin above the counter top is increased by banding 54, of glass or the like, in any desired manner. A ratchet strip 1 is mounted in place at the bottom of the bin along each of the edges thereof where partition supports may be desired. In addition, two parallel adjacent ratchet strips 56—57, each of the construction shown in Fig. 1, may be mounted across the bin as desired and spaced apart sufficiently to receive a divider 59 of glass or the like between them. The divider may be held in place at its opposite ends by end clips 62 of a construction similar to that illustrated at 25 in Fig. 6. Similar clips 63—63 may be used in connection with the ratchet strip 1 and in connection with the ratchet strips 56—57 for holding dividers 68—69 in place, thus dividing the top of the counter bin into a number of similar bins, as is clear from the illustration of Fig. 1. In each instance, the tongue of the clip 62 or 63 is rigidly held in a socket, such as the socket 17, in the corresponding ratchet strip thereby securely and rigidly holding the clip in place, with the result that the glass divider is also held in place firmly and without any possibility that it will slide along the ratchet strip.

Reference may now be had more particularly to Fig. 11 wherein there is shown the present invention as incorporated in a sham used on a counter, such as on the counter 50 of Fig. 1. The sham, indicated at 70, consists of an inverted trough or box made of any suitable material such as, for instance, steel, and having a substantially flat top 71 and sides 72—73, the height of the sham being less than the height of the dividers 68 or banding glass 54 so that the sham brings the bottom of the bin somewhat higher than it actually is, thereby decreasing the quantity of merchandise required to maintain a filled appearance of the bin. In the embodiment illustrated in Fig. 11, both sides 72 and 73 of the sham have, integrally formed therewith, a ratchet strip similar to the strip 1 of Fig. 3. This is made by forming two rows of slits, corresponding to the slits 6—6 of Fig. 1, with the slits of each row in alignment and spaced apart in the manner of Fig. 1. Above and below these slits there are formed two rows of slits 81—81 the slits of the upper and lower rows 81—81 being in alignment with one another and being each of substantially the same length as the slits 6. Each row of slits 81 contains half as many slits as each row of slits 6. In this arrangement, the metal of the side 72 (or 73) of the sham is pressed outwardly in three rows to form the upper row of flats 85, the center row of flats 86 and the lower row of flats 87. The flats of the upper and lower rows 85 and 87 are in vertical alignment with one another and are spaced apart by flat portions 89 where the metal has not been deformed. The row of flats 86 are separated by corresponding flat portions which are in the plane of the original metal of the sides 72. It is thus apparent that the metal at the flats 85, 86 and 87 has been stretched where the same has been pushed outwardly to form the corresponding flat, aligned flats forming a socket.

In Fig. 12 there is shown a clip 90 inserted in a socket in the ratchet formed at the side of the sham 70. This clip includes a channel member having a pair of wings 91—91 adapted to embrace and frictionally hold a dividing partition, such as a pane of glass 92, said wings being joined by a back to which a tongue 93 is spot welded or otherwise secured. The tongue 93 is a rectangular strip of sheet metal which strip may be offset inwardly, as indicated at 95 in Fig. 12, or which strip may be straight as indicated by the strip 93' of Fig. 13, or which strip may be offset rearwardly as indicated at 93a in Fig. 14, thus illustrating the three spacings of the end of the divider 92 from the edge of the sham as determined by the clip of Figs. 12, 13 or 14.

If it is desired to avoid weakening of the side of the sham, such as may result from stretching of the metal where the rack is formed, as in Fig. 11, the inverted box-like sham structure including a flat rectangular top 101 and longitudinal sides 101—102 may have a ratchet strip 1 secured, as by spot welding, to the outside of the sides 102—102 and extending lengthwise thereof adjacent to the top thereof, as illustrated in Figs. 15 and 16. If desired, the sham may have the ratchet strips 1 spot welded or otherwise secured thereto on the inner surfaces of the sides 102—102. When that is done, the top 101 is provided with slits 105 in alignment with one another along the longitudinal edges thereof, through which slits the tongues of the fastening clips may be inserted for insertion into the sockets of the ratchet strip below. The slits 105 may be each of a width of several sockets 17 with adjacent slits separated from one another by an unslit portion of metal 108, of the width of approximately one socket, or the slits 105 may each be of a width equal to the width of a socket 17, and the spacing between adjacent slits 105 made equal to or only slightly greater than the thickness of the metal of the sham.

Figure 2:
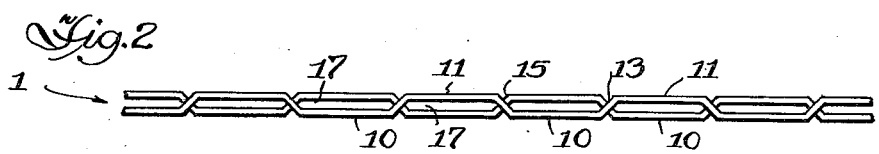
Fig. 2 is a plan view of a ratchet strip used in the structure of Fig. 1.

Fig. 19 shows a perspective view of still another embodiment of the present invention as applied to a sham. In this embodiment, the top of the sham is indicated at 71 and the sides are indicated at 72, the sham being an inverted trough-shaped or channel-shaped structure, or an inverted box-like structure, as is the sham of Fig. 11. The metal of the top 71 at the longitudinal edges thereof is stamped to form a number of rectangular slots 115 the metal of each slot being bent upwardly, as indicated at 116, to lie in the plane of the respective sides 72. Each portion 116 constitutes a tongue adapted to enter into one of the socket 17 of a ratchet strip, such as is illustrated in Fig. 2, each tongue being of a height approximately the height of the strip 1 and of a width slightly less than that of a socket and of a thickness slightly less than the depth of the socket, being similar to one of the tongues 30 of Fig. 6. The spacing between the adjacent tongues 116 is such that the tongues will enter into sockets 17 of a strip 1, the tongues entering into every fifth socket or every tenth socket or being spaced apart any other desired whole number of widths of a socket 17 of the strip 1. As a result, the ratchet strip, such as the strip 1, may be mounted on top of the sham 114 along each side of the sham for receiving clips, such as previously described, for holding dividers and the like.

As stated in the description of Fig. 11, the formation of the sockets involves stretching of the metal of the side of the sham. If it is desired to avoid or substantially to reduce the amount of stretching of the metal, each one of the flats formed in the side 72 of the sham may be slit by a vertical slit 125, as illustrated in Fig. 20. The sham of Fig. 20 is of the same construction as is the sham of Fig. 11 except that the metal is slit at 125 vertically centrally where each one of the flats 86', 87' and 88' is to be formed. This slitting is done before the flats are formed, that is, before the metal is pushed outwardly of the plane of the side 72. Thereafter, as the metal is die formed to form the flats 86', 87' and 88', the outward extension or bending of the metal outwardly of the plane of the side 72 produces the gap 125 without any appreciable stretching of the metal. This produces sockets in the manner of the sockets of Fig. 11 but without appreciable stretching of the metal.

In compliance with the requirements of the patent statutes we have here shown and described a few preferred embodiments of our invention. It is, however, to be understood that the invention is not limited to the precise constructions here shown, the same being merely illustrative of the principles of the invention. What we consider new and desire to secure by Letters Patent is:

Means for anchoring partition panels on a display counter, comprising a strip having three side by side sinuously bent lengths of material, the sinuous bends of each length comprising successive flats spaced from one another in a direction lengthwise of the strip and displaced on opposite sides of a median plane and joined by diagonals, oppositely inclined diagonals of successive lengths being juxtaposed and joined to constitute the successive lengths into a strip portion of an overall width is the sum of the widths of the said three lengths, the sinuous bends of the two outer lengths being in transverse alignment with one another, the sinuous bends of the center length being in transverse alignment and displaced from the corresponding bends of the outer lengths by an amount sufficient to bring each bent part of the central length midway between successive like bent parts of an outer length, thereby producing a number of successive tongue-receiving sockets for selectively receiving and supporting a tongue of apparatus used to facilitate displaying of merchandise, and thus supporting such apparatus in position at any socket in each of which sockets the center length overlies one side of a tongue that may be inserted into a socket and the end lengths overlie an opposite side of an inserted tongue, in adjacent sockets, the center length overlying the front of a tongue that may be inserted in one socket and the back of a tongue that may be inserted in an adjacent socket.

References Cited in the file of this patent
UNITED STATES PATENTS

| | | |
|---|---|---|
| 632,523 | Fugman | Sept. 5, 1899 |
| 1,059,464 | Hine | Apr. 22, 1913 |
| 1,473,318 | Ranson | Nov. 6, 1923 |
| 1,932,217 | Kaufman | Oct. 24, 1933 |
| 2,141,009 | Meyer | Dec. 20, 1938 |
| 2,529,826 | Walker | Nov. 14, 1950 |

U. S. DEPARTMENT OF COMMERCE
PATENT OFFICE

CERTIFICATE OF CORRECTION

Patent No. 2,820,684                                      January 21, 1958

Milton Zadek et al.

It is hereby certified that error appears in the printed specification of the above numbered patent requiring correction and that the said Letters Patent should read as corrected below.

Column 6, line 48, after "overall width" insert -- which --.

Signed and sealed this 18th day of March 1958.

(SEAL)
Attest:

KARL H. AXLINE
Attesting Officer

ROBERT C. WATSON
Commissioner of Patents